United States Patent
Huang et al.

(10) Patent No.: US 12,250,750 B2
(45) Date of Patent: Mar. 11, 2025

(54) COMMUNICATION METHOD, COMMUNICATIONS APPARATUS, DEVICE, AND COMMUNICATIONS SYSTEM

(71) Applicant: HUAWEI TECHNOLOGIES CO., LTD., Shenzhen (CN)

(72) Inventors: Jingjing Huang, Shenzhen (CN); Jun Chen, Dongguan (CN); Peng Liu, Shenzhen (CN); Guangjian Wang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 285 days.

(21) Appl. No.: 17/466,238

(22) Filed: Sep. 3, 2021

(65) Prior Publication Data
US 2021/0400462 A1 Dec. 23, 2021

Related U.S. Application Data

(63) Continuation of application No. PCT/CN2020/076445, filed on Feb. 24, 2020.

(30) Foreign Application Priority Data

Mar. 15, 2019 (CN) .......................... 201910200019.3

(51) Int. Cl.
*H04W 48/10* (2009.01)
*H04B 7/185* (2006.01)
(Continued)

(52) U.S. Cl.
CPC ........ *H04W 8/005* (2013.01); *H04B 7/18526* (2013.01); *H04W 48/10* (2013.01);
(Continued)

(58) Field of Classification Search
CPC .................. H04B 7/0617; H04B 7/18526; H04B 17/318; H04B 17/336; H04W 8/005;
(Continued)

(56) References Cited

U.S. PATENT DOCUMENTS 6,996,372 B2   2/2006 Noerpel et al.
9,209,891 B1  12/2015 Mandell et al.
(Continued)

FOREIGN PATENT DOCUMENTS

CN    103476125 A   12/2013
CN    104718712 A    6/2015
(Continued)

OTHER PUBLICATIONS

Zhou et al. "Low Latency Random Access with TTI Bundling in LTE/LTE-A." IEEE ICC 2015—Wireless Communications Symposium. Jun. 2015. pp. 2257-2263.

*Primary Examiner* — Frank Duong
(74) *Attorney, Agent, or Firm* — Maier & Maier, PLLC

(57) ABSTRACT

A communication method, a communications apparatus, a device, and a communications system. The method includes: a terminal device receives, by using a first beam, broadcast signals broadcast by N network devices, where each broadcast signal includes a current broadcast moment and identification information of a network device that broadcasts the broadcast signal, and N is a positive integer; the terminal device obtains a second beam corresponding to the broadcast signals, where a width of the first beam is greater than that of the second beam; the terminal device measures the broadcast signals of the N network devices by using the second beam corresponding to the broadcast signal; the terminal device obtains, based on a measurement result, a (Continued)

second beam corresponding to a target network device, where the target network device is one of the N network devices.

19 Claims, 5 Drawing Sheets

(51) Int. Cl.
| | | |
|---|---|---|
| *H04W 8/00* | (2009.01) | |
| *H04W 64/00* | (2009.01) | |
| *H04W 72/044* | (2023.01) | |
| *H04W 72/541* | (2023.01) | |

(52) U.S. Cl.
CPC ....... *H04W 64/003* (2013.01); *H04W 72/046* (2013.01); *H04W 72/541* (2023.01)

(58) Field of Classification Search
CPC ..... H04W 24/08; H04W 48/10; H04W 48/16; H04W 48/20; H04W 64/003; H04W 72/046; H04W 72/541; H04W 76/40
See application file for complete search history.

(56) References Cited

U.S. PATENT DOCUMENTS

| | | | | |
|---|---|---|---|---|
| 9,716,547 B2* | 7/2017 | Roos | ................ | H04B 7/18528 |
| 10,222,445 B2* | 3/2019 | Cummings | ............... | G01S 3/74 |
| 2003/0128159 A1* | 7/2003 | de La Chapelle | ....... | H01Q 3/26 |
| | | | | 342/359 |
| 2013/0057432 A1* | 3/2013 | Rajagopal | ............ | H01Q 25/002 |
| | | | | 342/368 |
| 2013/0109376 A1* | 5/2013 | Roos | ..................... | H04B 7/2041 |
| | | | | 455/427 |
| 2016/0093950 A1* | 3/2016 | Cummings | .............. | H01Q 3/04 |
| | | | | 342/359 |
| 2018/0164441 A1* | 6/2018 | Feria | ...................... | H01Q 21/22 |
| 2019/0261202 A1* | 8/2019 | Tang | ...................... | H04B 7/088 |
| 2019/0349049 A1* | 11/2019 | Li | ......................... | H04W 72/30 |

FOREIGN PATENT DOCUMENTS

| | | |
|---|---|---|
| CN | 104919715 A | 9/2015 |
| CN | 105122662 A | 12/2015 |
| CN | 105356981 A | 2/2016 |
| CN | 106253964 A | 12/2016 |
| CN | 106464336 A | 2/2017 |
| CN | 106559122 A | 4/2017 |
| CN | 107079411 A | 8/2017 |
| CN | 107223347 A | 9/2017 |
| CN | 107888237 A | 4/2018 |
| CN | 108260134 A | 7/2018 |
| CN | 108377559 A | 8/2018 |
| WO | 2016/115394 A1 | 7/2016 |

* cited by examiner

COMMUNICATION METHOD, COMMUNICATIONS APPARATUS, DEVICE, AND COMMUNICATIONS SYSTEM

CROSS-REFERENCE TO RELATED APPLICATIONS

This application is a continuation of International Application No. PCT/CN2020/076445, filed on Feb. 24, 2020, which claims priority to Chinese Patent Application No. 201910200019.3, filed on Mar. 15, 2019. The disclosures of the aforementioned applications are hereby incorporated by reference in their entireties.

TECHNICAL FIELD to the embodiments relate to the field of communication technologies, and in particular, to a communication method, a communications apparatus, a device, and a communications system.

BACKGROUND

In a satellite communications system (for example, Iridium, Globalstar, Thuraya, and the like), a satellite usually provides, by using a spot beam, a communications service for a ground terminal located in a coverage area of the spot beam. In this case, a beam of an antenna in the ground terminal needs to be targeted at the satellite to access the satellite.

In the case that the ground terminal does not know its location or a location of the satellite, however, blindly attempting to target at and accessing a satellite may be time-consuming Generally, a beam of the satellite and the beam of the antenna in the ground terminal need to be periodically scanned, until the two beams are aligned, so that the ground terminal can access the satellite. In particular, a process in which the antenna in the ground terminal uses a narrow beam to target at and access the satellite is more time-consuming and inefficient.

SUMMARY

The embodiments provide a communication method, a communications apparatus, a device, and a communications system, to implement a process in which a terminal device is connected to a network device by using beams with different beamwidths and smoothly performs data transmission with the network device. This improves access efficiency and reduces access duration.

According to a first aspect, the embodiments provide a communication method, including:
  a terminal device receives, by using a first beam, broadcast signals broadcast by N network devices, where each broadcast signal includes a current broadcast moment and identification information of a network device that broadcasts the broadcast signal, and N is a positive integer;
  the terminal device obtains a second beam corresponding to the broadcast signals, where a width of the first beam is greater than that of the second beam;
  the terminal device measures the broadcast signals of the N network devices by using the second beam corresponding to the broadcast signal;
  the terminal device obtains, based on a measurement result, a second beam corresponding to a target network device, where the target network device is one of the N network devices; and
  the terminal device performs data transmission with the target network device by using the second beam corresponding to the target network device.

A person of ordinary skill in the art can understand that the wider the beamwidth of an antenna in the terminal device is, the more broadcast signals the antenna can receive. Therefore, in this embodiment, the terminal device may set the first beam to be a beam with a relatively wide beamwidth (referred to as a wide beam for short herein), so that the terminal device can smoothly receive a broadcast signal broadcast by each network device, thereby reducing access duration.

A quantity N of network devices is not limited in this embodiment. For example, the terminal device may receive a broadcast signal broadcast by one network device or may receive broadcast signals broadcast by a plurality of network devices. In addition, each network device may broadcast one or more broadcast signals. Each network device may directly send the broadcast signal to the terminal device, or may forward the broadcast signal to the terminal device by using another device that has a feeder link to the terminal device.

A person of ordinary skill in the art can understand that a relatively narrow beamwidth of an antenna in the terminal device facilitates high-speed data transmission between the antenna and a network device. Therefore, based on a requirement of high-speed signal transmission, in this embodiment, the terminal device may set a second beam to be a beam with a relatively narrow beamwidth (referred to as a narrow beam for short herein). This is convenient for high-speed data transmission between the terminal device and the network device, thereby increasing a signal transmission rate. A specific beamwidth of the second beam is not limited in this embodiment, provided that the width of the first beam (a width mentioned herein refers to a beamwidth) is greater than that of the second beam.

Moreover, to ensure that the terminal device can select a proper network device for data transmission, after receiving a broadcast signal, the terminal device may obtain a second beam corresponding to the broadcast signal, and ensure that the second beam corresponding to the broadcast signal can be targeted at a network device corresponding to the broadcast signal, so that the terminal device can measure the signal by using the second beam.

In this embodiment, both the terminal device and the network device may use beams of different frequency bands, and/or the broadcast signal of the network device changes in real time because of a propagation loss and rain fade caused by signal attenuation brought by oxygen and water vapor in the atmosphere. Therefore, to avoid a phenomenon that the terminal device and the network device perform data transmission with an undesirable effect or cannot perform communication, the terminal device may measure performance, such as a multipath fading characteristic and frequency selectivity, of the broadcast signal of each network device by using the second beam corresponding to the broadcast signal, to learn a current status of the broadcast signal of each network device, and obtain the measurement result.

The broadcast signal of each network device may be the broadcast signals of N networks devices received by the terminal device, may be other currently received broadcast signals, or may be a combination of the foregoing two types of broadcast signals. This is not limited in this embodiment. In addition, a specific parameter used by the terminal device to measure the broadcast signal of each network device is not limited in this embodiment, provided that the parameter can indicate performance of the broadcast signal of the network device.

Because the measurement result can represent the performance of the broadcast signal of each network device, the terminal device may select, based on the measurement result, a network device suitable for performing data transmission with the terminal device, that is, the target network device, to improve data transmission reliability. Then, the terminal device can obtain the second beam corresponding to the target network device.

In addition to the performance of the broadcast signal of each network device, the terminal device may determine the target network device by comprehensively considering subjective and objective factors such as an actual requirement of the terminal device, so that the terminal device and the target network device smoothly perform data transmission.

In this embodiment, because the beamwidth of the second beam is relatively narrow, the terminal device can be connected to the target network device at high speed by using the second beam corresponding to the target network device. Then, the terminal device can perform data transmission with the target network device at high speed, thereby reducing access duration and improving access efficiency of the terminal device.

According to the communication method provided in the first aspect, because the beamwidth of the first beam is relatively wide, a coverage area of the first beam is relatively wide, and as many broadcast signals as possible fall within the coverage area of the first beam. Then, the terminal device can receive, as quickly as possible by using the first beam, the broadcast signal broadcast by each network device, thereby increasing a signal obtaining rate and reducing access duration. Moreover, that the terminal device uses a beam with a relatively narrow beamwidth facilitates high-speed data transmission between the terminal device and the network device. Therefore, the terminal device may set the width of the second beam to be relatively narrow, accurately obtain the second beam corresponding to the broadcast signal, and ensure that the second beam corresponding to the broadcast signal can be targeted at the network device corresponding to the broadcast signal, so that the terminal device can measure the broadcast signal of each network device by using the second beam corresponding to the broadcast signal, to obtain the measurement result indicating an actual status of the broadcast signal of each network device, and then determine the performance of the broadcast signal of each network device. In this case, the terminal device may select, from the N network devices based on the measurement result, the target network device suitable for performing data transmission with the terminal device, so that the terminal device can perform reliable data transmission with the target network device by using the second beam corresponding to the target network device. This omits a beam scanning process, reduces access duration, improves access efficiency, and ensures data transmission reliability.

In a possible implementation, the method further includes:

the terminal device determines locations of the N network devices and/or a location of the terminal device based on the broadcast signal.

In a possible implementation, that the terminal device determines locations of the N network devices based on the broadcast signal includes:

the terminal device determines the locations of the N network devices based on a correspondence between a location of a network device and a moment.

In a possible implementation, that the terminal device determines a location of the terminal device based on the broadcast signal includes:

the terminal device determines the location of the terminal device based on the locations of the N network devices and a propagation delay of the broadcast signal.

In this embodiment, based on each broadcast signal, the terminal device may learn the current broadcast moment at which the broadcast signal is broadcast, so that the terminal device can determine a specific moment at which each network device broadcasts the broadcast signal; and learn the identification information of the network device that broadcasts the broadcast signal, so that the terminal device can determine a corresponding specific network device based on the identification information.

A specific implementation form of the current broadcast moment is not limited in this embodiment.

Further, when receiving the broadcast signal, based on the current broadcast moment and the identification information of the network device, the terminal device may determine a location of each network device, or determine the location of the terminal device, or determine a location of each network device and the location of the terminal device.

In this embodiment, the location of each network device is fixed relative to the location of the terminal device. For example, the network device may be satellite equipment. The satellite equipment periodically runs around an Earth orbit and in a closed orbit, and the location of the terminal device is relatively fixed relative to the Earth. Optionally, the terminal device and/or another device that has a feeder link to the terminal device may prestore a correspondence between a location of a network device and identification information and/or the correspondence between a location of a network device and a moment in a form of a list, a matrix, or the like.

For example, that the network device is satellite equipment and the terminal device is a ground terminal is used as an example. The terminal device and/or a ground base station may store a correspondence between a location of satellite equipment and a moment by using a satellite ephemeris.

Further, the terminal device may determine, based on the correspondence between a location of a network device and identification information and/or the correspondence between a location of a network device and a moment, the location that is of the network device and that is corresponding to the current broadcast moment, to locate each network device.

In this embodiment, the location of the terminal device is relatively fixed, or the terminal device moves within a quite small range. Therefore, optionally, the terminal device may determine the location of the terminal device based on the location of the N network devices and the propagation delay of the broadcast signal. For example, the terminal device determines the location of the terminal device based on the received broadcast signal according to the following formula (1):

$$\sqrt{(x_i-x)^2+(y_i-y)^2+(z_i-z)^2}+c*\Delta t=d_i \qquad \text{formula (1)}$$

where coordinates (x, y, z) represent the location of the terminal device, coordinates $(x_i, y_i, z_i)$ represent the locations of the N network devices, i is a positive integer, i≤N, c is a propagation speed of light in a vacuum, $\Delta t$ represents a propagation delay of broadcasting a broadcast signal by a network device to the terminal device, and $d_i$ represents a distance between the network device and the terminal device.

Based on the foregoing descriptions, the terminal device may learn the location of the N network devices, that is, $x_i$, $y_i$, and $z_i$ are known. In addition, because the location of the terminal device is fixed relative to the location of each network device, the terminal device may learn in advance a distance between the terminal device and each network device, that is, $d_i$ is known. In this case, there are four unknown numbers x, y, z, and $\Delta t$ in the formula (1). A person of ordinary skill in the art can understand that, to calculate the four unknown numbers, the terminal device needs at least four broadcast signals if a least square method or another method is used, or the terminal device can reduce a quantity of broadcast signals by using an unknown-number elimination manner.

With reference to two cases in which the quantity N of network devices is greater than 1 and the quantity N of network devices is equal to 1, the following details a specific implementation process in which the terminal determines the location of the terminal device.

When the quantity N of network devices is greater than 1, the N network devices need to send at least four broadcast signals, that is, four or more broadcast signals, to the terminal device. Further, on a premise that each network device broadcasts at least one broadcast signal to the terminal device, the specific implementation process in which the terminal device determines the location of the terminal device is separately detailed by using three cases.

When the quantity N of network devices is greater than or equal to 4, the terminal device may receive at least four broadcast signals, and may determine the location of the terminal device according to the formula (1).

When the quantity N of network devices is equal to 3, if any network device separately broadcasts a broadcast signal to the terminal device at at least two different locations, the terminal device may receive at least four broadcast signals, and may determine the location of the terminal device according to the formula (1). If each network device broadcasts only one broadcast signal to the terminal device, the terminal device may receive three broadcast signals. Therefore, the terminal device needs to eliminate any one of the four unknown numbers in advance, and then determine the location of the terminal device according to the formula (1).

In a possible implementation, a measurement module for measuring any coordinate value of x, y, and z may be disposed in the terminal device. Further, the terminal device may measure any coordinate value of x, y, and z by using the measurement module, and then determine the location of the terminal device according to the formula (1).

For example, the terminal device may measure an altitude location of the terminal device, that is, a coordinate value z, by using an altitude measuring instrument, to eliminate the unknown number z.

In another possible implementation, $\Delta t$ may be calculated based on a primary synchronization signal (PSS) and/or a secondary synchronization signal (SSS), and PSSs and SSSs of the terminal device and another device that belong to a same area are respectively the same. Therefore, the another device that belongs to the same area as the terminal device may send a PSS and/or an SSS to each network device, so that the broadcast signal broadcast by each network device to the terminal device may include the PSS and/or the SSS in addition to the current broadcast moment and the identification information of the network device. In this case, the terminal device may receive the PSS and/or the SSS based on the broadcast signal, calculate $\Delta t$ based on the PSS and/or the SSS to eliminate the unknown number $\Delta t$, and then determine the location of the terminal device according to the formula (1).

When the quantity N of network devices is equal to 2, if the N network devices separately broadcast at least four broadcast signals to the terminal device at different locations, the terminal device may determine the location of the terminal device according to the formula (1). If each network device broadcasts only one broadcast signal to the terminal device, the terminal device may receive two broadcast signals. Therefore, the terminal device needs to eliminate any two of the four unknown numbers in advance, and then determine the location of the terminal device according to the formula (1).

In a possible implementation, a measurement module for measuring any two coordinate values of x, y, and z may be disposed in the terminal device. Further, the terminal device may measure any two coordinate values of x, y, and z by using the measurement module, and then determine the location of the terminal device according to the formula (1). For details thereof, refer to the implementation process in case of N=3. Details are not described herein again.

In another possible implementation, the terminal device may measure any coordinate value of x, y, and z by using the measurement module, and calculate $\Delta t$ based on the PSS and/or SSS in the broadcast signal to eliminate the unknown number $\Delta t$, and then determine the location of the terminal device according to the formula (1). For details thereof, refer to the implementation process in case of N=3. Details are not described herein again.

When the quantity N of network devices is equal to 1, if the network device separately broadcasts broadcast signals to the terminal device at at least four different locations, the terminal device may receive at least four broadcast signals, and may determine the location of the terminal device according to the formula (1). In addition, the terminal device may eliminate any three of the four unknown numbers by referencing the implementation processes in case of N=2 and N=3, and determine the location of the terminal device according to the formula (1). For details thereof, refer to the implementation processes in case of N=2 and N=3. Details are not described herein again.

According to the communication method provided in this implementation, each broadcast signal includes the current broadcast moment and the identification information of the network device that broadcasts the broadcast signal, and the location of each network device is fixed relative to the location of the terminal device. Therefore, the terminal device can determine the location of each network device and the location of the terminal device based on the received broadcast signal, without using another device, so that the terminal device can be automatically connected to the N network devices, thereby improving access efficiency. Alternatively, the terminal device can determine, by using another device, the location of the N network devices and/or the location of the terminal device by reducing a quantity of received broadcast signals.

In a possible implementation, that the terminal device obtains a second beam corresponding to the broadcast signals includes:

the terminal device obtains, based on the locations of the N network devices and the location of the terminal device, an azimuth angle and an elevation angle of the second beam corresponding to the broadcast signal.

According to the communication method provided in this implementation, to determine the second beam more accurately, the terminal device may determine, based on the location of each network device and the location of the terminal device, an azimuth angle and an elevation angle of a second beam corresponding to each broadcast signal, so that the terminal device can accurately measure the actual status of the broadcast signal of the network device by using the second beam, thereby improving data transmission reliability.

For example, when determining the location of the terminal device and a location of any network device, the terminal device may determine an azimuth angle and an elevation angle of a second beam corresponding to a broadcast signal broadcast by the network device, according to the following formula (2):

$$\begin{cases} A = tg^{-1} \dfrac{tg(\phi_2 - \phi_1)}{\sin\beta} \\ E = tg^{-1} \dfrac{\cos(\phi_2 - \phi_1) * \cos\beta - 0.15}{\sqrt{1 - [\cos(\phi_2 - \phi_1) * \cos\beta]^2}} \end{cases} \qquad \text{formula (2)}$$

where A is the azimuth angle of the second beam, E is the elevation angle of the second beam, $\phi_1$ is a longitude value of the terminal device, $\phi_2$ is a longitude value of the network device, and β is a latitude value of the network device.

In a possible implementation, that the terminal device measures the broadcast signals of the N network devices by using the second beam corresponding to the broadcast signals includes:
the terminal device determines signal-to-noise ratios of the broadcast signal of the N network devices based on the second beam corresponding to the broadcast signals; and
the terminal device determines the signal-to-noise ratios as the measurement result.

In a possible implementation, that the terminal device obtains, based on a measurement result, a second beam corresponding to a target network device includes:
the terminal device determines a network device with a largest signal-to-noise ratio as the target network device based on the measurement result; and
the terminal device determines an azimuth angle and an elevation angle of the second beam corresponding to the target network device.

In a possible implementation, that the terminal device determines an azimuth angle and an elevation angle of the second beam corresponding to the target network device includes:
the terminal device determines, based on a location of the target network device and the location of the terminal device, the azimuth angle and the elevation angle of the second beam corresponding to the target network device; or
the terminal device determines, based on the target network device and the azimuth angle and the elevation angle of the second beam corresponding to the broadcast signal, the azimuth angle and the elevation angle of the second beam corresponding to the target network device.

In a possible implementation, that a terminal device receives, by using a first beam, broadcast signals broadcast by N network devices includes:
the terminal device receives, by using the first beam having a same frequency as a target frequency, the broadcast signal broadcast by the network device by using a beam of the network device, where the target frequency is a frequency of the beam of the network device that broadcasts the broadcast signal.

According to the communication method provided in this implementation, when the network device directly broadcasts a broadcast signal to the terminal device, to facilitate receiving of the broadcast signal by the terminal device, optionally, each network device may broadcast, to the terminal device in advance, a frequency of a beam used by the network device, that is, a target frequency. Then, by using a first beam having a same frequency as the target frequency, the terminal device can quickly receive the broadcast signal broadcast by each network device, thereby increasing a receiving rate of the network device and reducing access duration.

In a possible implementation, each broadcast signal includes at least one of the following forms:
a broadcast signal broadcast by a network device by enabling one beam and disabling other beams;
a broadcast signal of a network device in which a supercapacitor is disposed; and
a broadcast signal satisfying a preset strength.

According to the communication method provided in this implementation, the broadcast signal received by the terminal device is a broadcast signal that any network device may broadcast to the terminal device after improving transmission efficiency, to compensate for a gain difference between the first beam and the second beam of the terminal device. This reduces impact of the gain difference on the terminal device.

In a possible implementation, the first beam is a combination of a plurality of third beams, and a width of the third beam is less than that of the first beam. In this case, the terminal device may splice the plurality of third beams with relatively wide beamwidths to replace one first beam with a specific beamwidth, so as to reduce the gain difference between the first beam and the second beam.

In a possible implementation, the first beam is a high-band beam, the second beam is a high-band beam, and a beam of each network device is a high-band beam; or the first beam is a low-band beam, the second beam is a high-band beam, and beams of each network device include a low-band beam and a high-band beam; or the first beam is a low-band beam, the second beam is a low-band beam, and a beam of each network device is a low-band beam. According to the communication method provided in the first aspect.

Further, the terminal device is provided with the first beam and the second beam. Therefore, based on performance of the first beam and the second beam, the terminal device receives broadcast signals by using the first beam, and measures the broadcast signals and is targeted at the network device by using the second beam, thereby reducing access duration and improving access efficiency.

The terminal device may set a frequency band of the first beam and a frequency band of the second beam, and a frequency band of the network device changes as the frequency band of the first beam and the frequency band of the second beam change. The following details the foregoing specific process.

A person of ordinary skill in the art can understand that operating frequency bands obtained through division by the International Telecommunication Union (ITU) for satellite communication are L, S, C, X, Ku, and Ka frequency bands, and services such as a voice service and a data service with a narrow bandwidth or a wide bandwidth are developed on this basis. Low frequency bands such as an L frequency band and an S frequency band feature a wide coverage area, and are usually used for a language service or a low-speed data service. In contrast, high frequency bands such as a Ku frequency band and a Ka frequency band have advantages of small interference and a small device size, and are usually used for high-speed data transmission services such as a high-definition television service and a gigabit-level bandwidth service. In addition, a low frequency band and a high frequency band are corresponding to different beamwidths because of different frequency bands and different bandwidths. Generally, due to a high frequency band, and relatively large path attenuation and atmospheric attenuation, a high frequency band is corresponding to a higher antenna gain and a narrower beamwidth compared with a low frequency band.

Further, on a premise of ensuring that the first beam is a wide beam and the second beam is a narrow beam, specific frequency bands of the first beam and the second beam are detailed based on the foregoing descriptions. Moreover, in this embodiment, a beam of each network device is usually a narrow beam.

In a possible implementation, the first beam is a high-band beam, and the second beam is a high-band beam, so that the terminal device and the network device can transmit a high-speed signal with each other, to satisfy a requirement of a high-speed data service. In addition, a beam of each network device may be a high-band beam. In this way, in one aspect, each network device can broadcast a broadcast signal to the terminal device by using a high-band beam, so that the terminal device can receive the broadcast signal by using a high-band beam (that is, the first beam). In another aspect, data can be transmitted between the high-band beam of the terminal device and the high-band beam (that is, the second beam) of the network device.

In another possible implementation, the first beam is a low-band beam, and the second beam is a high-band beam, so that the terminal device and the network device can transmit a high-speed signal with each other, to satisfy a requirement of a high-speed data service. In addition, a beam of each network device may include a low-band beam and a high-band beam. In this way, in one aspect, each network device can broadcast a broadcast signal to the terminal device by using a low-band beam, so that the terminal device can receive the broadcast signal by using a low-band beam (that is, the first beam). In another aspect, data can be transmitted between a high-band beam of the terminal device and a high-band beam (that is, the second beam) of the network device.

In another possible implementation, the first beam is a low-band beam, and the second beam is a low-band beam, so that the terminal device and the network device can transmit a low-speed signal with each other, to satisfy a requirement of a low-speed data service. In addition, a beam of each network device is a low-band beam. In this way, in one aspect, each network device can broadcast a broadcast signal to the terminal device by using a low-band beam, so that the terminal device can receive the broadcast signal by using a low-band beam (that is, the first beam). In another aspect, data can be transmitted between a low-band beam of the terminal device and the low-band beam (that is, the second beam) of the network device.

According to the communication method provided in this implementation, the terminal device is provided with the first beam and the second beam, and the width of the first beam is greater than that of the second beam. In addition, the terminal device may set the frequency band of the first beam and the frequency band of the second beam to be identical or different, and the frequency band of the network device may change as the frequency band of the first beam and the frequency band of the second beam change, so that the terminal device and the network device can smoothly perform data transmission in any scenario.

According to a second aspect, the embodiments provide a communication method, including:
a network device obtains signal strength of a broadcast signal; and
when the signal strength of the broadcast signal satisfies a preset condition, the network device sends the broadcast signal to a terminal device.

According to the communication method provided in the second aspect, the network device may represent transmit power of the broadcast signal by using the signal strength of the broadcast signal. When the signal strength of the broadcast signal satisfies the preset condition, the network device may determine that the transmit power of the broadcast signal is relatively high and that the relatively high transmit power can compensate for a gain difference between a first beam and a second beam. Further, the network device may directly send the broadcast signal to the terminal device. When the signal strength of the broadcast signal does not satisfy the preset condition, the network device determines that the transmit power of the broadcast signal is relatively low and that the relatively low transmit power cannot compensate for a gain difference between a first beam and a second beam. Further, the network device may adjust the broadcast signal to make strength of an adjusted broadcast signal satisfy the preset condition, and then send the adjusted broadcast signal to the terminal device.

In a possible implementation, maximum output power of the network device is usually invariable. Therefore, when the signal strength of the broadcast signal does not satisfy the preset condition, the network device adjusts the signal strength of the broadcast signal and increases the transmit power of the broadcast signal by enabling one beam and disabling other beams and concentrating all energy of the network device on the beam, to satisfy the preset condition.

In a possible implementation, when the signal strength of the broadcast signal does not satisfy the preset condition, the network device adjusts the signal strength of the broadcast signal and increases the transmit power of the broadcast signal by disposing a supercapacitor, to satisfy the preset condition. In addition, the network device may further increase the transmit power of the broadcast signal by disposing another module. Only the supercapacitor is used as an example in this embodiment.

In a possible implementation, as a length of the broadcast signal increases, it is usually required that the power of the broadcast signal should be reduced, for example, reduced by 3 dB. Therefore, when the signal strength of the broadcast signal does not satisfy the preset condition, the network device adjusts receiving duration of the broadcast signal and increases total energy of the broadcast signal by setting the length of the broadcast signal to satisfy a preset strength, to satisfy the preset condition.

According to a third aspect, the embodiments provide a communications apparatus, including:
a receiving module, configured to receive, by using a first beam, broadcast signals broadcast by N network devices, where each broadcast signal includes a current broadcast moment and identification information of a network device that broadcasts the broadcast signal, and N is a positive integer;
an obtaining module, configured to obtain a second beam corresponding to the broadcast signal, where a width of the first beam is greater than that of the second beam;

a measurement module, configured to measure the broadcast signal of the N network devices by using the second beam corresponding to the broadcast signal; where the obtaining module is further configured to obtain, based on a measurement result, a second beam corresponding to a target network device, where the target network device is one of the N network devices; and a transmission module, configured to perform data transmission with the target network device by using the second beam corresponding to the target network device.

In a possible implementation, the apparatus further includes:

a determining module, configured to determine a location of the N network devices and/or a location of the terminal device based on the broadcast signal.

In a possible implementation, the determining module is configured to determine the location of the N network devices based on a correspondence between a location of a network device and a moment.

In a possible implementation, the determining module is configured to determine the location of the terminal device based on the location of the N network devices and a propagation delay of the broadcast signal.

In a possible implementation, the obtaining module is configured to obtain, based on the location of the N network devices and the location of the terminal device, an azimuth angle and an elevation angle of the second beam corresponding to the broadcast signal.

In a possible implementation, the measurement module is configured to: determine a signal-to-noise ratio of the broadcast signal of the N network devices based on the second beam corresponding to the broadcast signal; and determine the signal-to-noise ratio as the measurement result.

In a possible implementation, the obtaining module is further configured to: determine a network device with a largest signal-to-noise ratio as the target network device based on the measurement result; and determine an azimuth angle and an elevation angle of the second beam corresponding to the target network device.

In a possible implementation, the obtaining module is configured to: determine, based on a location of the target network device and the location of the terminal device, the azimuth angle and the elevation angle of the second beam corresponding to the target network device; or determine, based on the target network device and the azimuth angle and the elevation angle of the second beam corresponding to the broadcast signal, the azimuth angle and the elevation angle of the second beam corresponding to the target network device.

In a possible implementation, the receiving module is configured to receive, by using the first beam having a same frequency as a target frequency, the broadcast signal broadcast by the network device by using a beam of the network device, where the target frequency is a frequency of the beam of the network device that broadcasts the broadcast signal.

In a possible implementation, each broadcast signal includes at least one of the following forms:

a broadcast signal broadcast by a network device by enabling one beam and disabling other beams;

a broadcast signal of a network device in which a supercapacitor is disposed; and a broadcast signal satisfying a preset strength.

In a possible implementation, the first beam is a combination of a plurality of third beams, and a width of the third beam is less than that of the first beam.

In a possible implementation, the first beam is a high-band beam, the second beam is a high-band beam, and a beam of each network device is a high-band beam; or the first beam is a low-band beam, the second beam is a high-band beam, and a beam of each network device includes a low-band beam and a high-band beam; or the first beam is a low-band beam, the second beam is a low-band beam, and a beam of each network device is a low-band beam.

For beneficial effects of the communications apparatus provided in the third aspect and the possible implementations of the third aspect, refer to the beneficial effects brought by the first aspect and the possible implementations of the first aspect. Details are not described herein again.

According to a fourth aspect, the embodiments provide a communications apparatus, including:

an obtaining module, configured to obtain signal strength of a broadcast signal; and a sending module, configured to: when the signal strength of the broadcast signal satisfies a preset condition, send the broadcast signal to a terminal device.

In a possible implementation, the apparatus further includes:

a first adjustment module, configured to: when the signal strength of the broadcast signal does not satisfy the preset condition, adjust the signal strength of the broadcast signal by enabling one beam and disabling other beams, to satisfy the preset condition.

In a possible implementation, the apparatus further includes:

a second adjustment module, configured to: when the signal strength of the broadcast signal does not satisfy the preset condition, adjust the signal strength of the broadcast signal by disposing a supercapacitor, to satisfy the preset condition.

In a possible implementation, the apparatus further includes:

a third adjustment module, configured to: when the signal strength of the broadcast signal does not satisfy the preset condition, adjust the signal strength of the broadcast signal by setting a length of the broadcast signal to satisfy a preset strength, to satisfy the preset condition.

For beneficial effects of the communications apparatus provided in the fourth aspect and the possible implementations of the fourth aspect, refer to the beneficial effects brought by the second aspect and the possible implementations of the second aspect. Details are not described herein again.

According to a fifth aspect, the embodiments provide a terminal device, including a memory and a processor, where the memory is configured to store program instructions; and the processor is configured to invoke the program instructions in the memory to perform the communication method in any one of the first aspect or the possible implementations of the first aspect.

According to a sixth aspect, the embodiments provide a network device, including a memory and a processor, where the memory is configured to store program instructions; and the processor is configured to invoke the program instructions in the memory to perform the communication method in any one of the second aspect or the possible implementations of the second aspect.

According to a seventh aspect, the embodiments provide a communications system, including the communications apparatus provided in any one of the third aspect or the possible implementations of the third aspect and N communications apparatuses provided in any one of the fourth aspect or the possible implementations of the fourth aspect, where N is a positive integer.

According to an eighth aspect, the embodiments provide a readable storage medium. The readable storage medium stores executable instructions. When at least one processor in a terminal device executes the executable instructions, the terminal device is enabled to perform the communication method in any one of the first aspect or the possible implementations of the first aspect.

According to a ninth aspect, the embodiments provide a readable storage medium. The readable storage medium stores executable instructions. When at least one processor in a network device executes the executable instructions, the network device is enabled to perform the communication method in any one of the second aspect or the possible implementations of the second aspect.

According to a tenth aspect, the embodiments provide a program product. The program product includes executable instructions. The executable instructions are stored in a readable storage medium. At least one processor in a terminal device may read the executable instructions from the readable storage medium. The at least one processor executes the executable instructions, so that the terminal device performs the communication method in any one of the first aspect or the possible implementations of the first aspect.

According to an eleventh aspect, the embodiments provide a program product. The program product includes executable instructions. The executable instructions are stored in a readable storage medium. At least one processor in a network device may read the executable instructions from the readable storage medium. The at least one processor executes the executable instructions, so that the network device performs the communication method in any one of the second aspect or the possible implementations of the second aspect.

According to a twelfth aspect, the embodiments provide a chip. The chip is connected to a memory, or the chip is integrated with a memory. When software programs stored in the memory are executed, the communication method in any one of the possible implementations is implemented.

According to a thirteenth aspect, the embodiments provide a terminal device, configured to implement the communication method in any one of the first aspect or the possible implementations of the first aspect.

According to a fourteenth aspect, the embodiments provide a network device, configured to implement the communication method in any one of the second aspect or the possible implementations of the second aspect.

DESCRIPTION OF EMBODIMENTS

Figure 1:
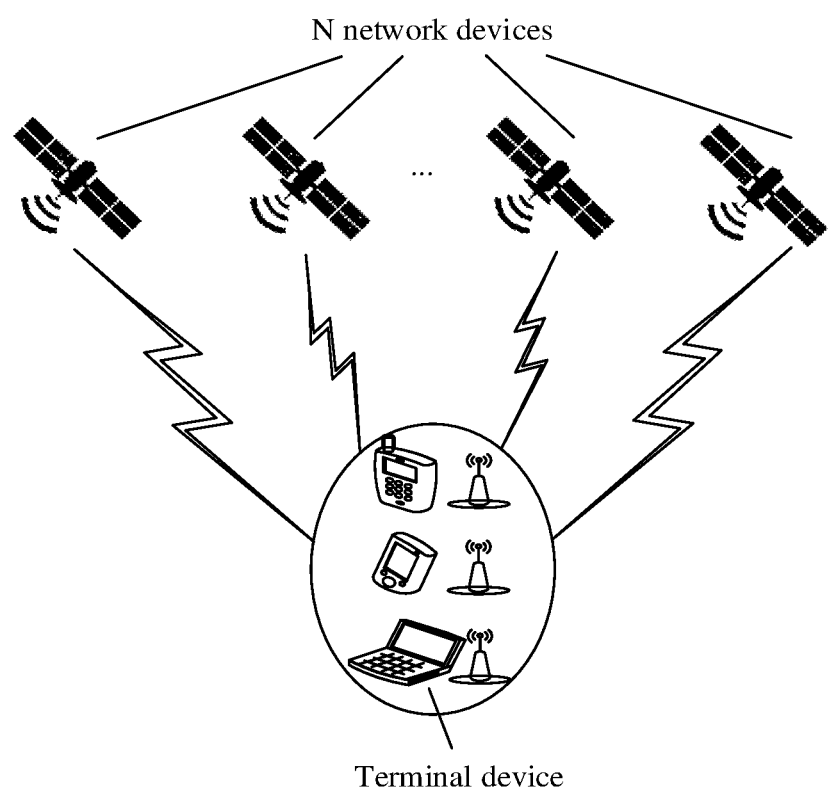
FIG. 1 is a schematic diagram of a communications system according to an embodiment.

Embodiments can be applied to a wireless communications system. It should be noted that the wireless communications system in the embodiments includes, but is not limited to, a narrowband Internet of Things (NB-IoT) system, a global system for mobile communications (GSM), an enhanced data rates for GSM evolution (EDGE) system, a wideband code division multiple access (WCDMA) system, a code division multiple access 2000 (CDMA2000) system, a time division-synchronous code division multiple access (TD-SCDMA) system, a long term evolution (LTE) system, a fifth generation (5G) system in the future, and future communications systems such as a sixth generation (6G) system.

A communications apparatus in the embodiments includes a network device or a terminal device.

The network device is a device having a wireless receiving/sending function or a chip that may be disposed in the device. The device includes, but is not limited to, an evolved NodeB (eNB), a radio network controller (RNC), a NodeB (NB), abase station controller (BSC), a base transceiver station (BTS), a home NodeB (HNB), or a baseband unit (BBU); an access point (AP), a wireless relay node, a wireless backhaul node, or a transmission and reception point (TRP, or transmission point, TP) in a wireless fidelity (WI-FI) system; a gNB or a transmission point (a TRP or a TP) in a 5G system such as an NR system; one antenna panel or a group of antenna panels (including a plurality of antenna panels) of a gNB in the 5G system; a network node, such as a BBU) or a distributed unit (DU), that forms a gNB or a transmission point; or satellite equipment. The satellite equipment may include, but is not limited to, high-throughput satellite equipment with a relatively narrow beamwidth and may provide services for applications such as mobile communications including maritime communications, aviation airborne communications, and land vehicle-mounted communications, and fixed satellite broadband Internet access.

In some deployments, the gNB may include a centralized unit (CU) and a DU. The gNB may further include a radio unit (RU). The CU and the DU each implements some functions of the gNB. For example, the CU implements functions of a radio resource control (RRC) layer and a packet data convergence protocol (PDCP) layer, while the DU implements functions of a radio link control (RLC) layer, a media access control (MAC) layer, and a physical (PHY) layer. Information at the RRC layer finally becomes information at the PHY layer or is transformed from information at the PHY layer. Therefore, in such an architecture, it may be considered that higher layer signaling such as RRC layer signaling or PDCP layer signaling is sent by the DU or is sent by the DU and the CU. It can be understood that the network device may be a CU node, a DU node, or a device including a CU node and a DU node. In addition, the CU may be classified as a network device in an access network RAN, or the CU may be classified as a network device in a core network CN. This is not limited herein.

The terminal device may also be referred to as user equipment (UE), an access terminal, a subscriber unit, a subscriber station, a mobile station, a mobile console, a remote station, a remote terminal, a mobile device, a user terminal, a terminal, a wireless communication device, a user agent, a user apparatus, or the like. The terminal device in the embodiments may be a mobile phone, a tablet computer (pad), a computer having a wireless receiving/sending function, a virtual reality (VR) terminal device, an augmented reality (AR) terminal device, a wireless terminal in industrial control, a wireless terminal in self-driving, a wireless terminal in a remote medical application, a wireless terminal in a smart grid, a wireless terminal in transportation safety, a wireless terminal in a smart city, a wireless terminal in a smart home, or the like. No application scenario is limited in the embodiments. A terminal device having a wireless receiving/sending function and a chip that may be disposed in the terminal device are collectively referred to as terminal devices in the embodiments.

FIG. 1 is a schematic diagram of a communications system according to an embodiment. As shown in FIG. 1, the communications system in the embodiments may include a network device and a terminal device. The network device and the terminal device may perform data transmission in various transmission modes.

Various transmission modes include optical fiber transmission suitable for long-distance wired transmission, x digital subscriber line (xDSL) suitable for medium-distance wired transmission, coaxial cable direct connection suitable for short-distance wired transmission, and microwave and satellite modes suitable for wireless transmission.

In FIG. 1, that the network device is satellite equipment and the terminal device is a ground terminal is used as an example for describing a data transmission process between the satellite equipment and the ground terminal.

In actual application, the communications system usually forms a plurality of spot beams at a same moment to cover different areas on the ground, so as to implement data transmission between the satellite equipment and the ground terminal. Each piece of satellite equipment needs to use an appropriate quantity of spot beams to cover, in real time, an area that the satellite equipment needs to serve. For example, when a beam of the satellite equipment covers the area in which the ground terminal is located, the ground terminal cannot be connected to the satellite equipment if a beam of an antenna in the ground terminal is not targeted at the satellite. The ground terminal can complete initial access only if a beam of an antenna in the ground terminal is targeted at the satellite equipment. Therefore, after the ground terminal is connected to the satellite equipment, data transmission can be performed between the satellite equipment and the ground terminal.

In a process in which the ground terminal is targeted at the satellite equipment, the ground terminal needs to determine a location of the ground terminal and a location of the satellite equipment. Otherwise, the ground terminal is blindly targeted at the satellite equipment. The beam of the antenna in the ground terminal and the beam of the satellite equipment are usually scanned periodically, and the ground terminal can be connected to the satellite equipment only after the two beams are aligned with each other. This access process consumes a large amount of time and has low efficiency.

The embodiments provide a communication method, a communications apparatus, a device, and a communications system, to reduce duration in which a terminal device is targeted at and connected to a network device, and improve access efficiency of the terminal device, while implementing data transmission between the terminal device and the network device. The following details a specific implementation process of the communication method in the embodiments with reference to FIG. 2.

Figure 2:
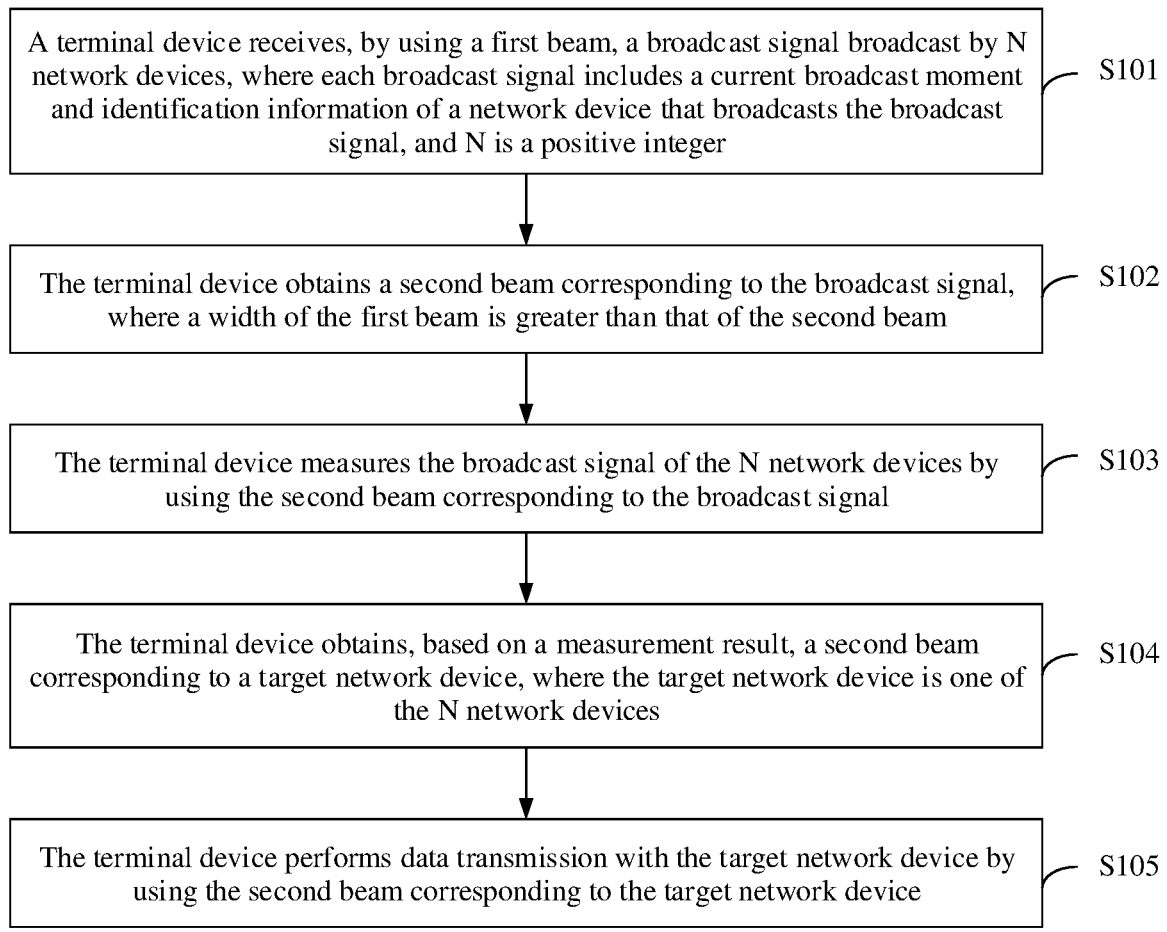
FIG. 2 is a flowchart of a communication method according to an embodiment.

FIG. 2 is a flowchart of an embodiment of a communication method according to the embodiments. As shown in FIG. 2, the communication method in this embodiment may include the following steps.

S101. A terminal device receives, by using a first beam, broadcast signals broadcast by N network devices, where each broadcast signal includes a current broadcast moment and identification information of a network device that broadcasts the broadcast signal, and N is a positive integer.

A person of ordinary skill in the art can understand that the wider the beamwidth of an antenna in the terminal device is, the more broadcast signals the antenna can receive. Therefore, in this embodiment, the terminal device may set the first beam to be a beam with a relatively wide beamwidth (referred to as a wide beam for short herein), so that the terminal device can smoothly receive a broadcast signal broadcast by each network device, thereby reducing access duration. A specific beamwidth of the first beam is not limited in this embodiment.

A quantity N of network devices is not limited in this embodiment. For example, the terminal device may receive a broadcast signal broadcast by one network device or may sequentially receive or simultaneously receive broadcast signals broadcast by a plurality of network devices, which is determined based on a capability of the terminal device. This is not limited in the embodiments. Moreover, any network device may use a broadcast signal in the prior art, or may use a broadcast signal in another format. Furthermore, network devices may use broadcast signals in a same format, or may use broadcast signals in different formats. For example, a network device may use a broadcast signal in a "frame header and data packet" format. The frame header may carry an identifier of the network device and/or an identifier of the terminal device. This is convenient for the terminal device to perform identification to receive broadcast signals in sequence. The data packet may carry communications data transmitted by the network device to the terminal device, for example, audio data, video data, or file data. In addition, each network device may broadcast one or more broadcast signals. Each network device may directly send the broadcast signal to the terminal device, or may forward the broadcast signal to the terminal device by using another device that has a feeder link to the terminal device.

For example, that the network device is satellite equipment and the terminal device is a ground terminal is used as an example. The satellite equipment may directly broadcast a broadcast signal to the ground terminal, or may forward the broadcast signal to the ground terminal by using a ground base station. The ground base station and the ground terminal are connected to each other, and a feeder link exists between the ground base station and the ground terminal.

In this embodiment, when the network device directly broadcasts a broadcast signal to the terminal device, to facilitate receiving of the broadcast signal by the terminal device, optionally, each network device may broadcast, to the terminal device in advance, a frequency of a beam used by the network device, that is, a target frequency. Then, by using a first beam having a same frequency as the target frequency, the terminal device can quickly receive the broadcast signal broadcast by each network device, thereby increasing a receiving rate of the network device and reducing access duration.

Further, based on each broadcast signal, the terminal device may learn the current broadcast moment at which the broadcast signal is broadcast, so that the terminal device can determine a specific moment at which each network device broadcasts the broadcast signal; and learn the identification information of the network device that broadcasts the broadcast signal, so that the terminal device can determine a corresponding specific network device based on the identification information.

A specific implementation form of the current broadcast moment is not limited in this embodiment. For example, the current broadcast moment may use a form of an identifier, a numeral, or code.

For example, in this embodiment, a list may be created in advance based on a correspondence between a moment and an identifier, and both the terminal device and the network device store the list. Therefore, the network device may add an identifier corresponding to the current broadcast moment to the broadcast signal based on the list, and the terminal device may determine, based on the list, a moment corresponding to the identifier, to determine the current broadcast moment. Alternatively, the network device and the terminal device may negotiate on a fixed conversion format of the moment in advance. Then, the network device may convert the current broadcast moment into a corresponding numeral based on the format and transmit the numeral to the terminal device by using the broadcast signal, and the terminal device may convert the numeral into the corresponding moment based on the format, to determine the current broadcast moment.

The identification information may be information for uniquely identifying the network device. For example, the identification information may be a device model of the network device or a number of the network device. For another example, the identification information may be an ID of the network device.

Further, when receiving the broadcast signal, based on the current broadcast moment and the identification information of the network device, the terminal device may determine a location of each network device, or determine the location of the terminal device, or determine a location of each network device and the location of the terminal device.

In this embodiment, the location of each network device is fixed relative to the location of the terminal device. For example, the network device may be satellite equipment. The satellite equipment periodically runs around an Earth orbit and in a closed orbit, and the location of the terminal device is relatively fixed relative to the Earth. Optionally, the terminal device and/or another device that has a feeder link to the terminal device may prestore a correspondence between a location of a network device and identification information and/or a correspondence between a location of a network device and a moment in a form of a list, a matrix, or the like.

For example, that the network device is satellite equipment and the terminal device is a ground terminal is used as an example. The terminal device and/or the ground base station may store a correspondence between a location of satellite equipment and a moment by using a satellite ephemeris.

Further, the terminal device may determine, based on the correspondence between a location of a network device and identification information and/or the correspondence between a location of a network device and a moment, the location that is of the network device and that is corresponding to the current broadcast moment, to locate each network device.

In this embodiment, the location of the terminal device is relatively fixed, or the terminal device moves within a quite small range. Therefore, optionally, the terminal device may determine the location of the terminal device based on a location of the N network devices and a propagation delay of the broadcast signal. For example, the terminal device determines the location of the terminal device based on the received broadcast signal according to the following formula (1):

$$\sqrt{(x_i-x)^2+(y_i-y)^2+(z_i-z)^2}+c*\Delta t=d_i \quad \text{formula (1)}$$

where coordinates (x, y, z) represent the location of the terminal device, coordinates ($x_i$, $y_i$, $z_i$) represent the location of the N network devices, i is a positive integer, $i \leq N$, c is a propagation speed of light in a vacuum, $\Delta t$ represents a propagation delay of broadcasting a broadcast signal by a network device to the terminal device, and $d_i$ represents a distance between the network device and the terminal device.

Based on the foregoing descriptions, the terminal device may learn the location of the N network devices, that is, $x_i$, $y_i$, and $z_i$ are known. In addition, because the location of the terminal device is fixed relative to the location of each network device, the terminal device may learn in advance a distance between the terminal device and each network device, that is, $d_i$ is known. In this case, there are four unknown numbers x, y, z, and $\Delta t$ in the formula (1). A person of ordinary skill in the art can understand that, to calculate the four unknown numbers, the terminal device needs at least four broadcast signals if a least square method or another method is used, or the terminal device can reduce a quantity of broadcast signals by using an unknown-number elimination manner.

With reference to two cases in which the quantity N of network devices is greater than 1 and the quantity N of network devices is equal to 1, the following details a specific implementation process in which the terminal device determines the location of the terminal device.

When the quantity N of network devices is greater than 1, the N network devices need to send at least four broadcast signals, that is, four or more broadcast signals, to the terminal device. Further, on a premise that each network device broadcasts at least one broadcast signal to the terminal device, the specific implementation process in which the terminal device determines the location of the terminal device is separately detailed by using three cases.

When the quantity N of network devices is greater than or equal to 4, the terminal device may receive at least four broadcast signals, and may determine the location of the terminal device according to the formula (1).

When the quantity N of network devices is equal to 3, if any network device separately broadcasts broadcast signals to the terminal device at at least two different locations, the terminal device may receive at least four broadcast signals, and may determine the location of the terminal device according to the formula (1). If each network device broadcasts only one broadcast signal to the terminal device, the terminal device may receive three broadcast signals. Therefore, the terminal device needs to eliminate any one of the four unknown numbers in advance, and then determine the location of the terminal device according to the formula (1).

In a possible implementation, a measurement module for measuring any coordinate value of x, y, and z may be disposed in the terminal device. Further, the terminal device may measure any coordinate value of x, y, and z by using the measurement module, and then determine the location of the terminal device according to the formula (1).

For example, the terminal device may measure an altitude location of the terminal device, that is, a coordinate value z, by using an altitude measuring instrument, to eliminate the unknown number z.

In another possible implementation, Δt may be calculated based on a primary synchronization signal (PSS) and/or a secondary synchronization signal (SSS), and PSSs and SSSs of the terminal device and another device that belong to a same area are respectively the same. Therefore, the another device that belongs to the same area as the terminal device may send a PSS and/or an SSS to each network device, so that the broadcast signal broadcast by each network device to the terminal device may include the PSS and/or the SSS in addition to the current broadcast moment and the identification information of the network device. In this case, the terminal device may receive the PSS and/or the SSS based on the broadcast signal, calculate Δt based on the PSS and/or the SSS to eliminate the unknown number Δt, and then determine the location of the terminal device according to the formula (1).

When the quantity N of network devices is equal to 2, if the N network devices separately broadcast at least four broadcast signals to the terminal device at different locations, the terminal device may determine the location of the terminal device according to the formula (1). If each network device broadcasts only one broadcast signal to the terminal device, the terminal device may receive two broadcast signals. Therefore, the terminal device needs to eliminate any two of the four unknown numbers in advance, and then determine the location of the terminal device according to the formula (1).

In a possible implementation, a measurement module for measuring any two coordinate values of x, y, and z may be disposed in the terminal device. Further, the terminal device may measure any two coordinate values of x, y, and z by using the measurement module, and then determine the location of the terminal device according to the formula (1). For details thereof, refer to the implementation process in case of N=3. Details are not described herein again.

In another possible implementation, the terminal device may measure any coordinate value of x, y, and z by using the measurement module, and calculate Δt based on the PSS and/or SSS in the broadcast signal to eliminate the unknown number Δt, and then determine the location of the terminal device according to the formula (1). For details thereof, refer to the implementation process in case of N=3. Details are not described herein again.

When the quantity N of network devices is equal to 1, if the network device separately broadcasts broadcast signals to the terminal device at at least four different locations, the terminal device may receive at least four broadcast signals, and may determine the location of the terminal device according to the formula (1). In addition, the terminal device may eliminate any three of the four unknown numbers by referencing the implementation processes in case of N=2 and N=3, and determine the location of the terminal device according to the formula (1). For details thereof, refer to the implementation processes in case of N=2 and N=3. Details are not described herein again.

Further, the terminal device can determine the location of the N network devices and/or the location of the terminal device based on the broadcast signal, without using another device. In this way, the terminal device can locate the N network devices without relying on another device. Alternatively, the terminal device can determine, by using another device, the location of the N network devices and/or the location of the terminal device by reducing a quantity of received broadcast signals.

S102. The terminal device obtains a second beam corresponding to the broadcast signal, where a width of the first beam is greater than that of the second beam.

In one aspect, a person of ordinary skill in the art can understand that a relatively narrow beamwidth of an antenna in the terminal device facilitates high-speed data transmission between the antenna and a network device. Therefore, based on a requirement of high-speed signal transmission, in this embodiment, the terminal device may set a second beam to be a beam with a relatively narrow beamwidth (referred to as a narrow beam for short). This is convenient for high-speed data transmission between the terminal device and the network device, thereby increasing a signal transmission rate. A specific beamwidth of the second beam is not limited in this embodiment, provided that the width of the first beam (a width mentioned herein refers to a beamwidth) is greater than that of the second beam.

In another aspect, to ensure that the terminal device can select a proper network device for data transmission, after receiving broadcast signals, the terminal device may obtain a second beam corresponding to the broadcast signals, and ensure that the second beam corresponding to the broadcast signal can be targeted at a network device corresponding to the broadcast signal, so that the terminal device can measure the signal by using the second beam.

Further, based on the specific process of step S101, the terminal device may determine the location of each network device and the location of the terminal device based on the received broadcast signal. To determine the second beam more accurately, in this embodiment, optionally, the terminal device may determine, based on the location of each network device and the location of the terminal device, an azimuth angle and an elevation angle of a second beam corresponding to each broadcast signal.

For example, when determining the location of the terminal device and a location of any network device, the terminal device may determine an azimuth angle and an elevation angle of a second beam corresponding to a broadcast signal broadcast by the network device, according to the following formula (2):

$$\begin{cases} A = tg^{-1} \dfrac{tg(\phi_2 - \phi_1)}{\sin\beta} \\ E = tg^{-1} \dfrac{\cos(\phi_2 - \phi_1) * \cos\beta - 0.15}{\sqrt{1 - [\cos(\phi_2 - \phi_1) * \cos\beta]^2}} \end{cases} \quad \text{formula (2)}$$

where A is the azimuth angle of the second beam, E is the elevation angle of the second beam, $\phi_1$ is a longitude value of the terminal device, $\phi_2$ is a longitude value of the network device, and β is a latitude value of the network device.

Further, based on the specific processes of steps S101 and S102, the terminal device is provided with the first beam and the second beam. Therefore, based on performance of the first beam and the second beam, the terminal device receives broadcast signals by using the first beam, and measures the broadcast signals and is targeted at the network device by using the second beam, thereby reducing access duration and improving access efficiency.

The terminal device may set a frequency band of the first beam and a frequency band of the second beam, and a frequency band of the network device changes as the frequency band of the first beam and the frequency band of the second beam change. The following details the foregoing specific process.

A person of ordinary skill in the art can understand that operating frequency bands obtained through division by the International Telecommunication Union (ITU) for satellite communication are L, S, C, X, Ku, and Ka frequency bands, and services such as a language service and a data service with a narrow bandwidth or a wide bandwidth are developed on this basis. Low frequency bands such as an L frequency band and an S frequency band feature a wide coverage area, and are usually used for a language service or a low-speed data service. In contrast, high frequency bands such as a Ku frequency band and a Ka frequency band have advantages of small interference and a small device size, and are usually used for high-speed data transmission services such as a high-definition television service and a gigabit-level bandwidth service. In addition, a low frequency band and a high frequency band are corresponding to different beamwidths because of different frequency bands and different bandwidths. Generally, due to a high frequency band, and relatively large path attenuation and atmospheric attenuation, a high frequency band is corresponding to a higher antenna gain and a narrower beamwidth compared with a low frequency band.

Further, on a premise of ensuring that the first beam is a wide beam and the second beam is a narrow beam, specific frequency bands of the first beam and the second beam are detailed based on the foregoing descriptions. Moreover, in this embodiment, a beam of each network device is usually a narrow beam.

In a possible implementation, the first beam is a high-band beam, and the second beam is a high-band beam, so that the terminal device and the network device can transmit a high-speed signal with each other, to satisfy a requirement of a high-speed data service. In addition, a beam of each network device may be a high-band beam. In this way, in one aspect, each network device can broadcast a broadcast signal to the terminal device by using a high-band beam, so that the terminal device can receive the broadcast signal by using a high-band beam (that is, the first beam). In another aspect, data can be transmitted between the high-band beam of the terminal device and the high-band beam (that is, the second beam) of the network device.

In another possible implementation, the first beam is a low-band beam, and the second beam is a high-band beam, so that the terminal device and the network device can transmit a high-speed signal with each other, to satisfy a requirement of a high-speed data service. In addition, a beam of each network device may include a low-band beam and a high-band beam. In this way, in one aspect, each network device can broadcast a broadcast signal to the terminal device by using a low-band beam, so that the terminal device can receive the broadcast signal by using a low-band beam (that is, the first beam). In another aspect, data can be transmitted between a high-band beam of the terminal device and a high-band beam (that is, the second beam) of the network device.

In another possible implementation, the first beam is a low-band beam, and the second beam is a low-band beam, so that the terminal device and the network device can transmit a low-speed signal with each other, to satisfy a requirement of a low-speed data service. In addition, a beam of each network device is a low-band beam. In this way, in one aspect, each network device can broadcast a broadcast signal to the terminal device by using a low-band beam, so that the terminal device can receive the broadcast signal by using a low-band beam (that is, the first beam). In another aspect, data can be transmitted between a high-band beam of the terminal device and the low-band beam (that is, the second beam) of the network device.

Further, the terminal device is provided with the first beam and the second beam, and the width of the first beam is greater than that of the second beam. In addition, the terminal device may set the frequency band of the first beam and the frequency band of the second beam to be identical or different, and the frequency band of the network device may change as the frequency band of the first beam and the frequency band of the second beam change, so that the terminal device and the network device can smoothly perform data transmission in any scenario.

S103. The terminal device measures the broadcast signal of the N network devices by using the second beam corresponding to the broadcast signal.

In this embodiment, both the terminal device and the network device may use beams of different frequency bands, and/or the broadcast signal of the network device changes in real time because of a propagation loss and rain fade caused by signal attenuation brought by oxygen and water vapor in the atmosphere. Therefore, to avoid a phenomenon that the terminal device and the network device perform data transmission with an undesirable effect or cannot perform communication, the terminal device may measure performance, such as a multipath fading characteristic and frequency selectivity, of the broadcast signal of each network device by using the second beam corresponding to the broadcast signal, to learn a current status of the broadcast signal of each network device, and obtain a measurement result.

The broadcast signal of each network device may be the broadcast signal received by the terminal device in step S101, may be other broadcast signals, or may be a combination of the foregoing two types of broadcast signals. This is not limited in this embodiment. In addition, a specific parameter used by the terminal device to measure the broadcast signal of each network device is not limited in this embodiment, provided that the parameter can indicate performance of the broadcast signal of the network device.

Optionally, the terminal device may determine a signal-to-noise ratio (SNR) of the broadcast signal of each network device based on the second beam corresponding to the broadcast signal. Then, the terminal device may determine the signal-to-noise ratio of the broadcast signal of each network device as the measurement result.

S104. The terminal device obtains, based on the measurement result, a second beam corresponding to a target network device, where the target network device is one of the N network devices.

Because the measurement result can represent the performance of the broadcast signal of each network device, the terminal device may select, based on the measurement result, a network device suitable for performing data transmission with the terminal device, that is, the target network device, to improve data transmission reliability. Then, the terminal device can obtain the second beam corresponding to the target network device.

In addition to the performance of the broadcast signal of each network device, the terminal device may determine the target network device by comprehensively considering subjective and objective factors such as an actual requirement of the terminal device, so that the terminal device and the target network device smoothly perform data transmission.

Optionally, when the measurement result is the signal-to-noise ratio of the broadcast signal of each network device, the terminal device may determine a network device with a largest signal-to-noise ratio as the target network device based on the measurement result. In other words, the terminal device may select, from the N network devices, a network device with best performance as the target network device. Then, the terminal device may determine an azimuth angle and an elevation angle of the second beam corresponding to the target network device.

By using two implementations, the following details a specific implementation in which the terminal device obtains the azimuth angle and the elevation angle of the second beam.

In a possible implementation, because the terminal device has determined the target network device, the terminal device may determine, based on a location of the target network device and the location of the terminal device according to the formula (2), the azimuth angle and the elevation angle of the second beam corresponding to the target network device. For details thereof, refer to the implementation process of step S102. Details are not described herein again.

In another possible implementation, because the terminal device has determined the target network device, and the azimuth angle and the elevation angle of the second beam corresponding to the broadcast signal are obtained in step S102, the terminal device may determine, based on the target network device and the azimuth angle and the elevation angle of the second beam corresponding to the broadcast signal, the azimuth angle and the elevation angle of the second beam corresponding to the target network device.

S105. The terminal device performs data transmission with the target network device by using the second beam corresponding to the target network device.

In this embodiment, because the beamwidth of the second beam is relatively narrow, the terminal device can be connected to the target network device at high speed by using the second beam corresponding to the target network device. Then, the terminal device can perform data transmission with the target network device at high speed, thereby reducing access duration and improving access efficiency of the terminal device.

According to the communication method provided in this embodiment, because the beamwidth of the first beam is relatively wide, a coverage area of the first beam is relatively wide, and as many broadcast signals as possible fall within the coverage area of the first beam. Then, the terminal device can receive, as quickly as possible by using the first beam, the broadcast signal broadcast by each network device, thereby increasing a signal obtaining rate and reducing access duration. In addition, each broadcast signal includes the current broadcast moment and the identification information of the network device that broadcasts the broadcast signal, and the location of each network device is fixed relative to the location of the terminal device. Therefore, the terminal device can determine the location of each network device and the location of the terminal device based on the received broadcast signal, without using another device, so that the terminal device can be automatically connected to the N network devices, thereby improving access efficiency. Moreover, that the terminal device uses a beam with a relatively narrow beamwidth facilitates high-speed data transmission between the terminal device and the network device. Therefore, the terminal device may set the width of the second beam to be relatively narrow, accurately obtain the second beam corresponding to the broadcast signal, and ensure that the second beam corresponding to the broadcast signal can be targeted at the network device corresponding to the broadcast signal, so that the terminal device can measure the broadcast signal of each network device by using the second beam corresponding to the broadcast signal, to obtain the measurement result indicating an actual status of the broadcast signal of each network device, and then determine the performance of the broadcast signal of each network device. In this case, the terminal device may select, from the N network devices based on the measurement result, the target network device suitable for performing data transmission with the terminal device, so that the terminal device can perform reliable data transmission with the target network device by using the second beam corresponding to the target network device. This omits a beam scanning process, reduces access duration, improves access efficiency, and ensures data transmission reliability.

Based on the embodiment in FIG. 2, because the terminal device is provided with the first beam and the second beam, and the width of the first beam is greater than that of the second beam, inevitably, there is a gain difference between the first beam and the second beam, and the gain difference deteriorates receiving performance of the terminal device. In some cases, the gain difference is approximately 20 dB.

To resolve the foregoing problem, in this embodiment, in one aspect, optionally, the first beam is a combination of a plurality of third beams, and a width of the third beam is less than that of the first beam. For example, the terminal device may splice the plurality of third beams with relatively wide beamwidths to replace one first beam with a specific beamwidth, so as to reduce the gain difference between the first beam and the second beam.

For example, the terminal device may splice four 35°×35° third beams to implement one 70°×70° first beam. In this way, the gain difference is reduced to 15 dB.

Figure 3:
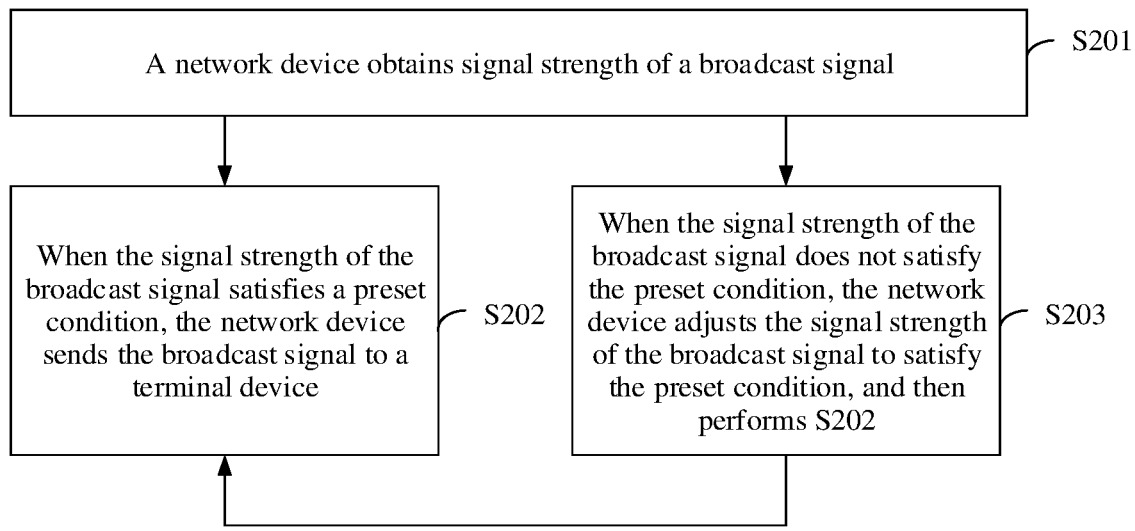
FIG. 3 is a flowchart of a communication method according to an embodiment.

In another aspect, any network device may broadcast a broadcast signal with relatively high transmission efficiency to the terminal device, to compensate for the gain difference between the first beam and the second beam of the terminal device. This reduces impact of the gain difference on the terminal device. With reference to FIG. 3, the following uses a network device as an example for detailing a specific implementation process in which the network device improves broadcast signal transmission efficiency.

FIG. 3 is a flowchart of an embodiment of a communication method according to the embodiments. As shown in FIG. 3, the communication method in this embodiment may include the following steps.

S201. The network device obtains signal strength of a broadcast signal.

S202. When the signal strength of the broadcast signal satisfies a preset condition, the network device sends the broadcast signal to a terminal device.

S203. When the signal strength of the broadcast signal does not satisfy the preset condition, the network device adjusts the signal strength of the broadcast signal to satisfy the preset condition, and then performs S202.

In this embodiment, the network device may represent transmit power of the broadcast signal by using the signal strength of the broadcast signal. When the signal strength of the broadcast signal satisfies the preset condition, the network device may determine that the transmit power of the broadcast signal is relatively high and that the relatively high transmit power can compensate for a gain difference between a first beam and a second beam. Further, the network device may directly send the broadcast signal to the terminal device. When the signal strength of the broadcast signal does not satisfy the preset condition, the network device determines that the transmit power of the broadcast signal is relatively low and that the relatively low transmit power cannot compensate for a gain difference between a first beam and a second beam. Further, the network device may adjust the broadcast signal to make strength of an adjusted broadcast signal satisfy the preset condition, and then send the adjusted broadcast signal to the terminal device.

A specific implementation in which the network device improves the signal strength of the broadcast signal is not limited in this embodiment. By using three implementation methods, the following details the specific implementation in which the network device improves the signal strength of the broadcast signal.

In a possible implementation, maximum output power of the network device is usually invariable. Therefore, the network device may adjust the signal strength of the broadcast signal and increase the transmit power of the broadcast signal by enabling one beam and disabling other beams and concentrating all energy of the network device on the beam, to satisfy the preset condition.

In another possible implementation, the network device may instantaneously increase the transmit power of the broadcast signal and adjust the signal strength of the broadcast signal by disposing a supercapacitor, to satisfy the preset condition. In addition, the network device may further increase the transmit power of the broadcast signal by disposing another module. Only the supercapacitor is used as an example in this embodiment.

In another possible implementation, as a length of the broadcast signal increases, it is usually required that the power of the broadcast signal should be reduced, for example, reduced by 3 dB. Therefore, the network device adjusts receiving duration of receiving the broadcast signal and increases total energy of the broadcast signal by setting the length of the broadcast signal to satisfy a preset strength, to satisfy the preset condition.

For example, that the network device is satellite equipment and the terminal device is a ground terminal is used as an example. A typical value of a high-gain beam of the ground terminal is 6°×6°. A minimum elevation angle of the satellite equipment is 55°, and therefore a width of a wide beam of the ground terminal is not less than 70°×70°. In this case, the gain difference between the first beam and the second beam is 21 dB.

If a total quantity of beams of the satellite equipment is 16, the satellite equipment may disable 15 beams, and reserve one beam for broadcasting the broadcast signal. In this case, the transmit power of the broadcast signal can be increased by 12 dB.

If a supercapacitor is disposed on the satellite equipment, the transmit power of the broadcast signal can be increased by 6 dB instantaneously.

If the satellite equipment increases a length of a PSS sequence, it is required that the gain difference between the first beam and the second beam should be reduced by 3 dB.

With reference to the foregoing three implementations, the satellite equipment can compensate for a gain difference of approximately 20 dB, to satisfy a communication requirement between the ground terminal and the satellite equipment.

It should be noted that the network device may reduce the gain difference between the first beam and the second beam in one or more manners, to satisfy the communication requirement between the terminal device and the network device.

It can be understood that, in the foregoing method embodiments, operations performed by the terminal device may also be implemented by a component (for example, a chip or a circuit) that can be used for the terminal device, and operations performed by the network device may also be implemented by a component (for example, a chip or a circuit) that can be used for the network device.

Figure 4:
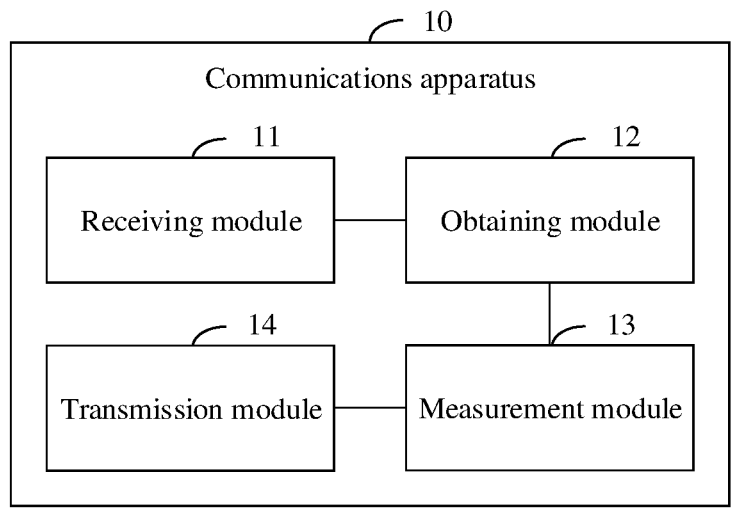
FIG. 4 is a schematic structural diagram of a communications apparatus according to an embodiment.

FIG. 4 is a schematic structural diagram of an embodiment of a communications apparatus according to the embodiments. Operations performed by the communications apparatus 10 may be implemented by a component (for example, a chip or a circuit) of a terminal device. As shown in FIG. 4, the communications apparatus 10 in this embodiment may include a receiving module 11, an obtaining module 12, a measurement module 13, and a transmission module 14.

The receiving module 11 is configured to receive, by using a first beam, broadcast signals broadcast by N network devices, where each broadcast signal includes a current broadcast moment and identification information of a network device that broadcasts the broadcast signal, and N is a positive integer;

the obtaining module 12 is configured to obtain a second beam corresponding to the broadcast signal, where a width of the first beam is greater than that of the second beam;

the measurement module 13 is configured to measure the broadcast signal of the N network devices by using the second beam corresponding to the broadcast signal; where the obtaining module 12 is further configured to obtain, based on a measurement result, a second beam corresponding to a target network device, where the target network device is one of the N network devices; and the transmission module 14 is configured to perform data transmission with the target network device by using the second beam corresponding to the target network device.

Figure 5:
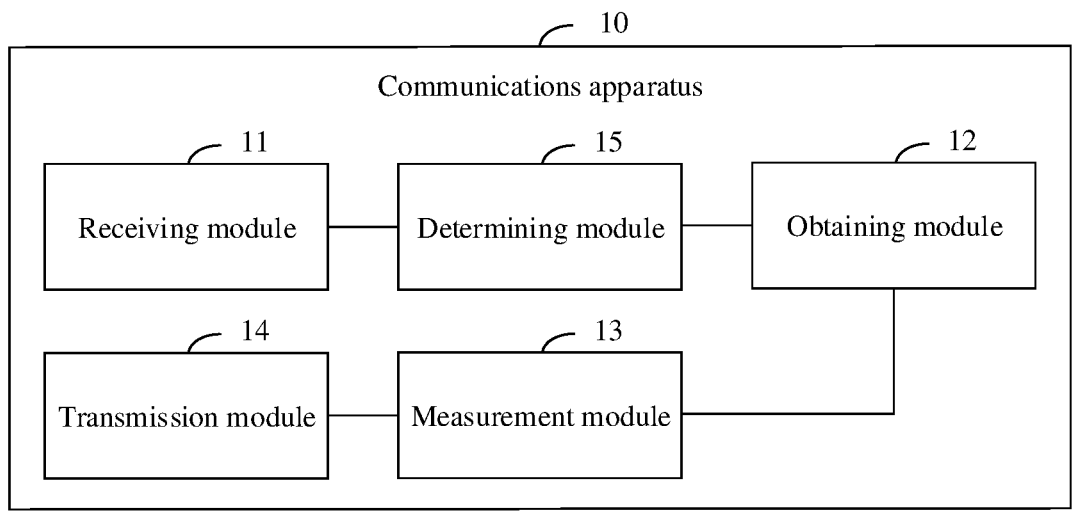
FIG. 5 is a schematic structural diagram of a communications apparatus according to an embodiment.

FIG. 5 is a schematic structural diagram of an embodiment of a communications apparatus according to the embodiments. As shown in FIG. 5, based on the structure shown in FIG. 4, the communications apparatus 10 in this embodiment may further include a determining module 15. The determining module 15 is configured to determine a location of the N network devices and/or a location of the terminal device based on the broadcast signal.

In some embodiments, the determining module 15 is configured to determine the location of the N network devices based on a correspondence between a location of a network device and a moment.

In some embodiments, the determining module 15 is configured to determine the location of the terminal device based on the location of the N network devices and a propagation delay of the broadcast signal.

In some embodiments, the obtaining module 12 is configured to obtain, based on the location of the N network devices and the location of the terminal device, an azimuth angle and an elevation angle of the second beam corresponding to the broadcast signal.

In some embodiments, the measurement module 13 is configured to: determine signal-to-noise ratios of the broadcast signal of the N network devices based on the second beam corresponding to the broadcast signal; and determine the signal-to-noise ratios as the measurement result.

In some embodiments, the obtaining module 12 is further configured to: determine a network device with a largest signal-to-noise ratio as the target network device based on the measurement result; and determine an azimuth angle and an elevation angle of the second beam corresponding to the target network device.

In some embodiments, the obtaining module 12 is configured to: determine, based on a location of the target network device and the location of the terminal device, the azimuth angle and the elevation angle of the second beam corresponding to the target network device; or determine, based on the target network device and the azimuth angle and the elevation angle of the second beam corresponding to the broadcast signal, the azimuth angle and the elevation angle of the second beam corresponding to the target network device.

In some embodiments, the receiving module 11 is configured to receive, by using the first beam having a same frequency as a target frequency, the broadcast signal broadcast by the network device by using a beam of the network device, where the target frequency is a frequency of the beam of the network device that broadcasts the broadcast signal.

In some embodiments, each broadcast signal includes at least one of the following forms:
 a broadcast signal broadcast by a network device by enabling one beam and disabling other beams;
 a broadcast signal of a network device in which a supercapacitor is disposed; and
 a broadcast signal satisfying a preset strength.

In some embodiments, the first beam is a combination of a plurality of third beams, and a width of the third beam is less than that of the first beam.

In some embodiments,
 the first beam is a high-band beam, the second beam is a high-band beam, and a beam of each network device is a high-band beam; or
 the first beam is a low-band beam, the second beam is a high-band beam, and a beam of each network device includes a low-band beam and a high-band beam; or
 the first beam is a low-band beam, the second beam is a low-band beam, and a beam of each network device is a low-band beam.

The communications apparatus in this embodiment may be configured to perform the solutions performed by the terminal device in the method embodiments shown in FIG. 1 to FIG. 3. An implementation principle and effects thereof are similar to those in the method embodiments. For operations implemented by the modules, refer to related descriptions in the method embodiments. Details are not described herein again. The modules herein may be replaced with components or circuits.

Figure 6:
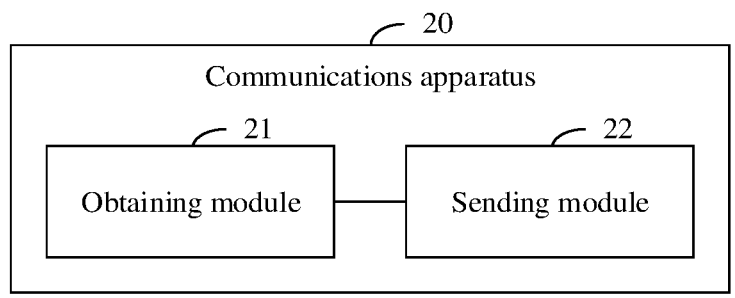
FIG. 6 is a schematic structural diagram of a communications apparatus according to an embodiment.

FIG. 6 is a schematic structural diagram of an embodiment of a communications apparatus according to the embodiments. Operations performed by the communications apparatus 20 may be implemented by a component (for example, a chip or a circuit) of a network device. As shown in FIG. 6, the communications apparatus 20 in this embodiment may include an obtaining module 21 and a sending module 22.

The obtaining module 21 is configured to obtain signal strength of a broadcast signal; and
 the sending module 22 is configured to: when the signal strength of the broadcast signal satisfies a preset condition, send the broadcast signal to a terminal device.

Figure 7:
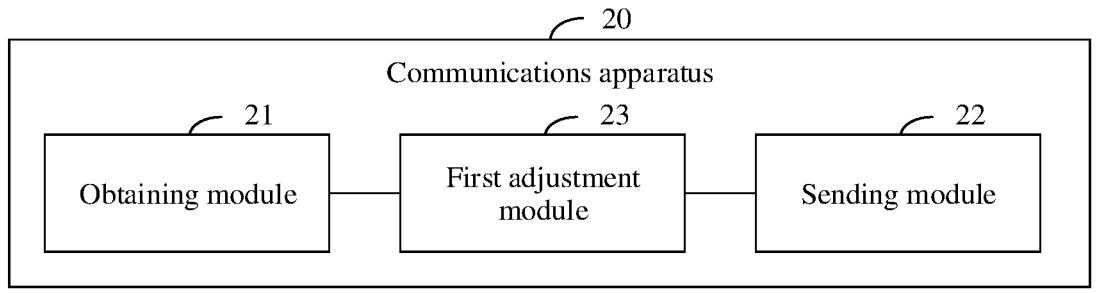
FIG. 7 is a schematic structural diagram of a communications apparatus according to an embodiment.

FIG. 7 is a schematic structural diagram of an embodiment of a communications apparatus according to the embodiments. As shown in FIG. 7, based on the structure shown in FIG. 6, the communications apparatus 20 in this embodiment may further include a first adjustment module 23. The first adjustment module 23 is configured to: when the signal strength of the broadcast signal does not satisfy the preset condition, adjust the signal strength of the broadcast signal by enabling one beam and disabling other beams, to satisfy the preset condition.

Figure 8:
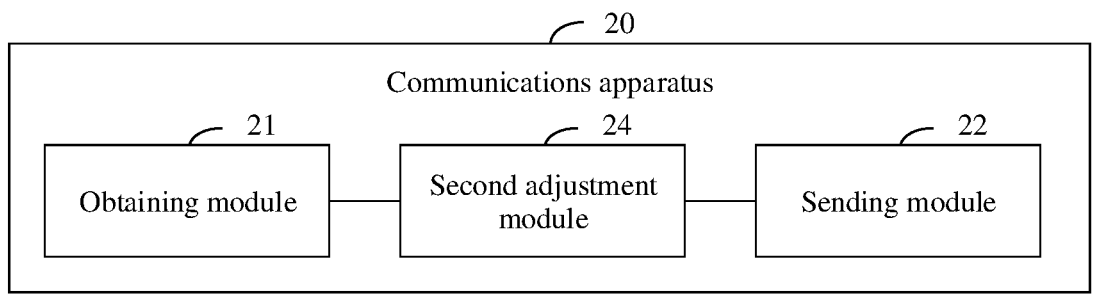
FIG. 8 is a schematic structural diagram of a communications apparatus according to an embodiment.

FIG. 8 is a schematic structural diagram of an embodiment of a communications apparatus according to the embodiments. As shown in FIG. 8, based on the structure shown in FIG. 6, the communications apparatus 20 in this embodiment may further include a second adjustment module 24. The second adjustment module 24 is configured to: when the signal strength of the broadcast signal does not satisfy the preset condition, adjust the signal strength of the broadcast signal by disposing a supercapacitor, to satisfy the preset condition.

Figure 9:
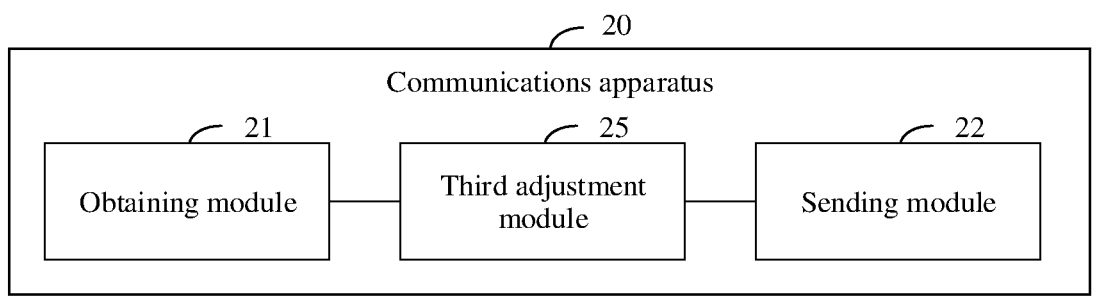
FIG. 9 is a schematic structural diagram of a communications apparatus according to an embodiment.

FIG. 9 is a schematic structural diagram of an embodiment of a communications apparatus according to the embodiment. As shown in FIG. 9, based on the structure shown in FIG. 6, the communications apparatus 20 in this embodiment may further include a third adjustment module 25. The third adjustment module 25 is configured to: when the signal strength of the broadcast signal does not satisfy the preset condition, adjust the signal strength of the broadcast signal by setting a length of the broadcast signal to satisfy a preset strength, to satisfy the preset condition.

The communications apparatus in this embodiment may be configured to perform the solutions performed by the network device in the method embodiments shown in FIG. 1 to FIG. 3. An implementation principle and effects thereof are similar to those in the method embodiments. For operations implemented by the modules, refer to related descriptions in the method embodiments. Details are not described herein again. The modules herein may be replaced with components or circuits.

In the embodiment, functional modules of the communications apparatus may be obtained through division based on the foregoing method examples. For example, each functional module may be obtained through division in correspondence to each function, or two or more functions may be integrated into one processing module. The integrated module may be implemented in a form of hardware, or may be implemented in a form of a software functional module. It should be noted that, in the embodiments, module division is used as an example, and is merely a logical function division. In actual implementation, another division manner may be used.

Figure 10:
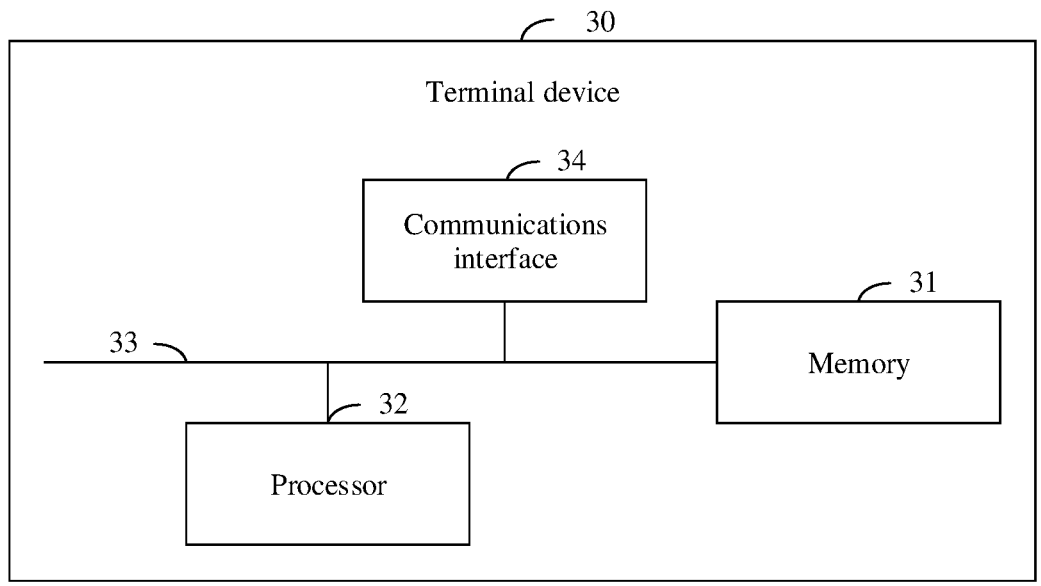
FIG. 10 is a schematic structural diagram of a terminal device according to the embodiments.

FIG. 10 is a schematic structural diagram of a terminal device according to the embodiments. As shown in FIG. 10, the terminal device 30 includes:
 a memory 31, configured to store program instructions, where the memory 31 may be a flash (flash memory); and
 a processor 32, configured to invoke and execute the program instructions in the memory to implement steps corresponding to the terminal device in the communication method in FIG. 1 to FIG. 3. For details thereof, refer to related descriptions in the foregoing method embodiments.

The terminal device 30 may further include an input/output interface 33. The input/output interface 33 may include an independent output interface and input interface, or may be an integrated interface integrating an input and an output. The output interface is configured to output data, and the input interface is configured to obtain input data. The output data is a generic term of an output in the foregoing method embodiments, and the input data is a generic term of an input in the foregoing method embodiments.

The terminal device 30 may be configured to perform steps and/or procedures corresponding to the corresponding terminal device in the foregoing method embodiments.

Figure 11:
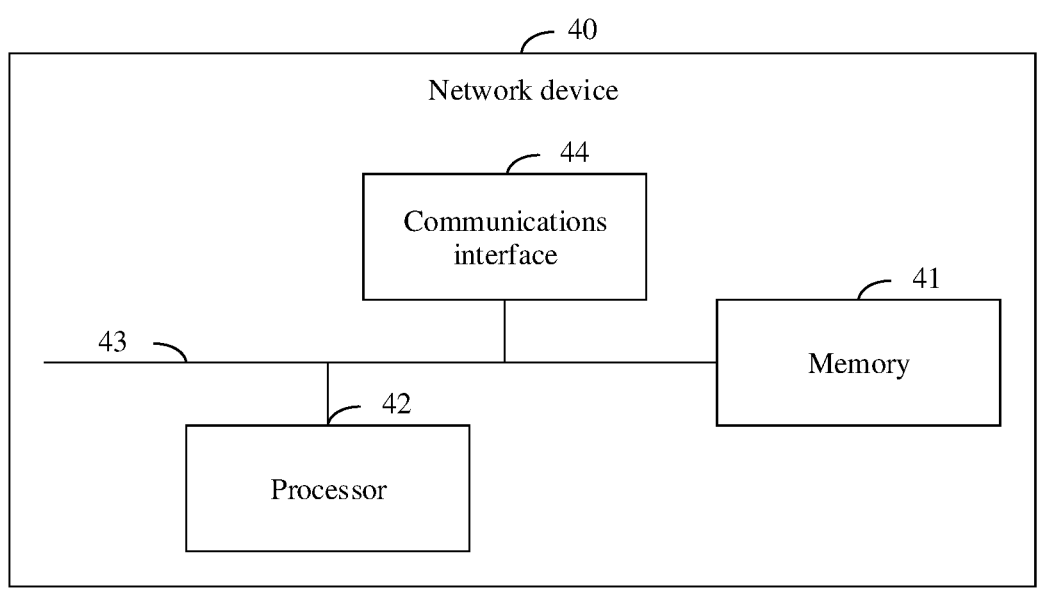
FIG. 11 is a schematic structural diagram of a network device according to the embodiments.

FIG. 11 is a schematic structural diagram of a network device according to the embodiments. As shown in FIG. 11, the network device 40 includes:

- a memory 41, configured to store program instructions, where the memory 41 may be a flash (flash memory); and
- a processor 42, configured to invoke and execute the program instructions in the memory to implement steps corresponding to the network device in the communication method in FIG. 1 to FIG. 3. For details thereof, refer to related descriptions in the foregoing method embodiments.

The network device 40 may further include an input/output interface 43. The input/output interface 43 may include an independent output interface and input interface, or may be an integrated interface integrating an input and an output. The output interface is configured to output data, and the input interface is configured to obtain input data. The output data is a generic term of an output in the foregoing method embodiments, and the input data is a generic term of an input in the foregoing method embodiments.

The network device 40 may be configured to perform steps and/or procedures corresponding to the corresponding network device in the foregoing method embodiments.

The embodiments further provide a readable storage medium. The readable storage medium stores executable instructions. When at least one processor in a terminal device executes the executable instructions, the terminal device is enabled to perform the communication methods in the foregoing method embodiment.

The embodiments further provide a readable storage medium. The readable storage medium stores executable instructions. When at least one processor in a network device executes the executable instructions, the network device is enabled to perform the communication methods in the foregoing method embodiment.

The embodiments further provide a program product. The program product includes executable instructions. The executable instructions are stored in a readable storage medium. At least one processor in a terminal device may read the executable instructions from the readable storage medium. The at least one processor executes the executable instructions, so that the terminal device performs the communication method in the foregoing methods embodiment.

The embodiments further provide a program product. The program product includes executable instructions. The executable instructions are stored in a readable storage medium. At least one processor in a network device may read the executable instructions from the readable storage medium. The at least one processor executes the executable instructions, so that the network device performs the communication method in the foregoing methods embodiment.

The embodiments further provide a chip. The chip is connected to a memory, or the chip is integrated with a memory. When software programs stored in the memory are executed, the communication methods in the foregoing method embodiment are implemented.

A person of ordinary skill in the art can understand that all or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid-state disk (SSD)), or the like.

What is claimed is:

1. A method comprising:
    receiving, by a terminal device using a first beam, broadcast signals broadcast by N network devices, wherein each broadcast signal comprises a current broadcast moment and identification information of a network device that broadcasts the broadcast signal, and N is a positive integer;
    obtaining, by the terminal device, a second beam corresponding to the broadcast signals based on the broadcast signals received by using the first beam, wherein a width of the first beam is greater than that of the second beam;
    measuring, by the terminal device, the broadcast signals of the N network devices by using the second beam corresponding to the broadcast signals;
    obtaining, by the terminal device based on a measurement result, a second beam corresponding to a target network device, wherein the target network device is one of the N network devices; and
    performing, by the terminal device, data transmission with the target network device by using the second beam corresponding to the target network device.

2. The method according to claim 1, further comprising:
    determining, by the terminal device, locations of the N network devices and/or a location of the terminal device based on the broadcast signal.

3. The method according to claim 2, wherein determining, by the terminal device, the locations of the N network devices based on the broadcast signal further comprises:
    determining, by the terminal device, the locations of the N network devices based on a correspondence between a location of a network device and a moment.

4. The method according to claim 2, wherein determining, by the terminal device, the location of the terminal device based on the broadcast signal further comprises:
    determining, by the terminal device, the location of the terminal device based on the locations of the N network devices and a propagation delay of the broadcast signal.

5. The method according to claim 1, wherein obtaining, by the terminal device, of the second beam corresponding to the broadcast signals further comprises:

obtaining, by the terminal device based on the locations of the N network devices and the location of the terminal device, an azimuth angle and an elevation angle of the second beam corresponding to the broadcast signals.

6. The method according to claim 1, wherein measuring, by the terminal device, of the broadcast signal of the N network devices by using the second beam corresponding to the broadcast signal further comprises:
determining, by the terminal device, signal-to-noise ratios of the broadcast signals of the N network devices based on the second beam corresponding to the broadcast signals; and
determining, by the terminal device, the signal-to-noise ratios as the measurement result.

7. The method according to claim 6, wherein obtaining, by the terminal device based on the measurement result, of the second beam corresponding to the target network device further comprises:
determining, by the terminal device, a network device with a largest signal-to-noise ratio as the target network device based on the measurement result; and
determining, by the terminal device, an azimuth angle and an elevation angle of the second beam corresponding to the target network device.

8. The method according to claim 1, wherein receiving, by the terminal device by using the first beam, of the broadcast signals broadcast by the N network devices further comprises:
receiving, by the terminal device by using the first beam having a same frequency as a target frequency, the broadcast signal broadcast by the network device by using a beam of the network device, wherein the target frequency is a frequency of the beam of the network device that broadcasts the broadcast signal.

9. The method according to claim 1, wherein each broadcast signal comprises:
a broadcast signal broadcast by a network device by enabling one beam and disabling other beams;
a broadcast signal of a network device in which a supercapacitor is disposed; and
a broadcast signal whose length satisfies a condition of a preset length.

10. The method according to claim 1, wherein the first beam is a combination of a plurality of third beams, and a width of the third beam is less than that the width of the first beam.

11. A method comprising:
obtaining, by a network device, a signal strength of a broadcast signal; when the signal strength of the broadcast signal satisfies a preset condition, sending, by the network device, the broadcast signal to a terminal device; and
when the signal strength of the broadcast signal does not satisfy the preset condition, adjusting, by the network device, the signal strength of the broadcast signal by setting a length of the broadcast signal to satisfy a condition of a preset length to satisfy the preset condition.

12. The method according to claim 11, wherein, when the signal strength of the broadcast signal does not satisfy the preset condition, the method further comprises:
adjusting, by the network device, the signal strength of the broadcast signal by enabling one beam and disabling other beams, to satisfy the preset condition.

13. The method according to claim 11, wherein, when the signal strength of the broadcast signal does not satisfy the preset condition, the method further comprises:
adjusting, by the network device, the signal strength of the broadcast signal by disposing a supercapacitor on satellite equipment, to satisfy the preset condition.

14. A terminal device comprising:
a memory configured to store program instructions; and
a processor configured to invoke the program instructions in the memory to:
receive, by using a first beam, broadcast signals broadcast by N network devices, wherein each broadcast signal comprises a current broadcast moment and identification information of a network device that broadcasts the broadcast signal, and N is a positive integer;
obtain a second beam corresponding to the broadcast signals based on the broadcast signals received by using the first beam, wherein a width of the first beam is greater than a width of the second beam;
measure the broadcast signals of the N network devices by using the second beam corresponding to the broadcast signals;
obtain based on a measurement result, a second beam corresponding to a target network device, wherein the target network device is one of the N network devices; and
perform data transmission with the target network device by using the second beam corresponding to the target network device.

15. The terminal device according to claim 14, wherein the processor is further configured to invoke the program instructions to:
determine locations of the N network devices and/or a location of the terminal device based on the broadcast signal.

16. The terminal device according to claim 15, wherein determining of the locations of the N network devices based on the broadcast signal further comprises:
determining the locations of the N network devices based on a correspondence between a location of a network device and a moment.

17. The terminal device according to claim 15, wherein determining of the location of the terminal device based on the broadcast signal further comprises:
determining, by the terminal device, the location of the terminal device based on the locations of the N network devices and a propagation delay of the broadcast signal.

18. The terminal device according to claim 14, wherein obtaining of the second beam corresponding to the broadcast signals further comprises:
obtaining, based on the locations of the N network devices and the location of the terminal device, an azimuth angle and an elevation angle of the second beam corresponding to the broadcast signals.

19. The terminal device according to claim 14, wherein measuring of the broadcast signal of the N network devices by using the second beam corresponding to the broadcast signal further comprises:
determining signal-to-noise ratios of the broadcast signals of the N network devices based on the second beam corresponding to the broadcast signals; and
determining the signal-to-noise ratios as the measurement result.

* * * * *